Oct. 13, 1931.                A. J. McDANEL                1,826,807
                                  GAUGE
                            Filed June 1, 1929
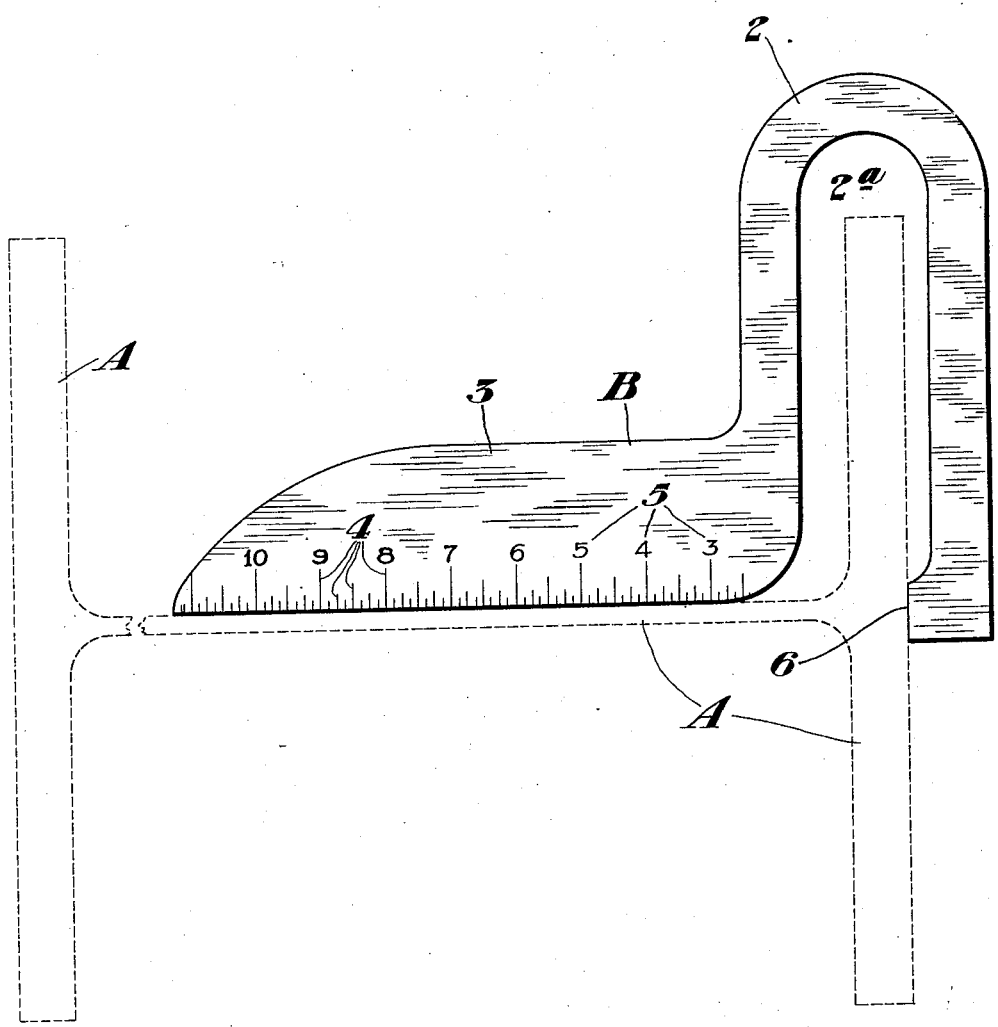
Inventor:
ABRAM J. McDANEL,
by: Usina & Rauber
his Attorneys.

Patented Oct. 13, 1931

1,826,807

UNITED STATES PATENT OFFICE

ABRAM J. McDANEL, OF NEW BRIGHTON, PENNSYLVANIA

GAUGE

Application filed June 1, 1929. Serial No. 367,713.

This invention relates to tools and more particularly to a laying-out tool or gauge for rolled metal H beams and the like, and has for its object the provision of a gauge that may be used to layout points on beam webs at the same distance from the outside face of the beam flanges without figuring the flange thickness, regardless of the thickness of the beam flanges.

In certain classes of beams the overall dimensions are the same for various weights and the varying weights are produced by varying the thickness of the flanges and webs. In fabricating beams of this class it is generally the practice to lay out the webs for punching and other work by indicating this distance of the layout points from the outside face of the flanges, since the outside or overall dimensions of the beams are constant for various sizes of beams. Heretofore, when using standard tools or scales it has been necessary for the workman to figure the thickness of the flange and then mentally calculate the layout points on the standard scale.

The present invention eliminates the necessity for this mental calculation with its chances of error and insures accuracy while at the same time speeding up the work materially.

In the drawing:

The figure shows the gauge applied in operative position on a beam.

Referring more particularly to the drawing the letter A designates a standard rolled H-beam and the letter B designates the novel gauge or tool of this invention.

The tool B, comprises a U-shaped jaw portion 2 the legs of which are spaced apart and are of such length that the space between the legs forms a throat 2ª of such dimensions that the portion 2 may be mounted over the flange of the various weight beams in a given series.

One leg of the jaw portion 2 is longer than the other leg by an amount equal to the thickness of the web of the beam being worked upon.

A lay-out scale member 3 in the form of a thin strip is formed integral with the free end of the short leg of the portion 2 and is provided with suitable scale markings 4 and indicia 5.

The inner face of the longer leg of the portion 2 is provided with a projection 6 at its free end and due to the greater length of this leg the projection 6 is adapted to bear against the outside face of the beam flange opposite the beam web. The beam flanges may have slight irregularities in thickness, but are generally constant adjacent the web, therefore by providing the projection 6 as a point of contact accurate positioning of the gauge or tool is assured.

In operation, the tool is mounted as shown in the drawing, and since the scale markings 4 are figured from the contact face of the projection 6, the markings 4 will be the same distance from the outside face of the beam flange regardless of the variations in the flange and web thickness, which varies in accordance with the beam weight, in all beams of a series.

It will be understood that a different tool will be provided for each series of beams having different overall dimensions.

While I have shown and described one specific embodiment of my invention it will be understood that I do not wish to be limited thereto since various modifications may be made without departing from the scope of my invention as defined in the appended claims.

I claim—

1. A one-piece integral gauge for laying out the webs of beams, comprising a substantially U-shaped jaw portion adapted to fit over the flange of the beam, said U-shaped jaw portion having a throat of sufficient dimensions to clear beam flanges of varying widths and thicknesses, one leg of said U-shaped jaw being of a slightly greater length than the other leg and being provided with a projection adjacent the free end of its inner face adapted to engage the outer face of the flange of the beam being worked upon, and a scale portion extending substantially at right angles to said other leg of said U-shaped portion.

2. A one-piece integral gauge for laying out the webs of H-beams, comprising a substantially U-shaped jaw portion adapted to fit over the flange of the beam, said U-shaped portion having a length greater than the width of the flange of the beam being worked upon and having one leg longer than the other leg by an amount which is substantially equal to the thickness of the web of the beam being worked upon, said U-shaped jaw portion having its legs spaced to form a throat of sufficient width to clear beam flanges of varying widths, said longer leg of said U-shaped portion being provided with a projection adjacent the free end of its inner face adapted to engage the outside face of the beam flange being worked upon, and a scale portion extending substantially at right angles to the shorter leg of said U-shaped portion.

In testimony whereof, I have hereunto set my hand.

ABRAM J. McDANEL.